United States Patent [19]

Hall et al.

[11]  4,350,742

[45]  Sep. 21, 1982

[54] METHOD TO ADHERE ACRYLIC FILMS TO STYRENIC POLYMERS

[75] Inventors: Richard A. Hall, Naperville; Edward J. Bernier, Jr., Romeoville, both of Ill.

[73] Assignee: Standard Oil Company (Indiana), Chicago, Ill.

[21] Appl. No.: 188,516

[22] Filed: Sep. 18, 1980

Related U.S. Application Data

[63] Continuation-in-part of Ser. No. 107,146, Dec. 26, 1979, abandoned.

[51] Int. Cl.$^3$ ............................................. B32B 27/08
[52] U.S. Cl. ........................... 428/520; 156/308.2; 428/519; 526/317; 526/347
[58] Field of Search ............... 156/308.2; 428/519, 428/520; 526/317, 347

[56] References Cited

U.S. PATENT DOCUMENTS

| | | | |
|---|---|---|---|
| 2,578,665 | 12/1951 | Bjorksten et al. | 428/520 |
| 3,040,011 | 6/1962 | Breitenbach et al. | 526/317 |
| 3,346,531 | 10/1967 | Rooney et al. | 526/317 |
| 3,562,235 | 2/1971 | Ryan | 428/220 |
| 3,619,344 | 11/1971 | Wolinski et al. | 428/520 |
| 3,654,069 | 4/1972 | Freudenberg | 526/317 |
| 3,734,896 | 5/1973 | Patton | 528/48 |

Primary Examiner—John J. Gallagher
Attorney, Agent, or Firm—Wallace L. Oliver; William T. McClain; William H. Magidson

[57]  ABSTRACT

A laminate is formed, without an adhesive, between an acrylic polymer film and a styrene polymer containing minor amounts of an $\alpha,\beta$-unsaturated carboxylic acid.

10 Claims, No Drawings

METHOD TO ADHERE ACRYLIC FILMS TO STYRENIC POLYMERS

CROSS-REFERENCE TO RELATED APPLICATIONS

This is a continuation-in-part of Ser. No. 107,146, filed Dec. 26, 1979, now abandoned.

BACKGROUND OF THE INVENTION

This invention relates to laminated styrene polymers and, more specifically, to a styrene polymer laminated to an acrylic film.

Frequently, it is desirable to modify the surface of a styrene resin by laminating onto the surface of such resin a covering layer of an acrylic resin. However, sheets of acrylic resins do not adhere well to polystyrene and up to now adhesives have been used to bond acrylic resins to polystyrene. U.S. Pat. No. 3,654,069 describes the use of adhesives to form a laminate between a styrene polymer and an acrylic resin sheet.

SUMMARY OF THE INVENTION

A laminate can be formed without an adhesive between an acrylic polymer film and a styrene polymer including rubber-modified styrene polymer containing minor amounts of an $\alpha,\beta$-unsaturated carboxylic acid.

BRIEF DESCRIPTION OF THE INVENTION

It has been found that an acrylic film can be bonded to a styrene polymer without the use of an adhesive. In the present invention a styrene polymer including rubber-modified polymer containing minor amounts of an $\alpha,\beta$-unsaturated carboxylic acid can be bonded under heat and pressure to an acrylic film. Surprisingly, a good bonded laminate is formed if an $\alpha,\beta$-unsaturated acid is incorporated with a styrene polymer. An acrylic film will not adhere satisfactorily without an adhesive to a styrene homopolymer or a rubber-modified styrene polymer.

Styrene polymer useful in this invention can be produced by techniques known in the art. Such techniques include solution, suspension and mass thermal polymerization processes which can be continuous or batch operation.

The styrene $\alpha,\beta$-unsaturated carboxylic acid copolymer useful in this invention can be formed by copolymerizing $\alpha,\beta$-unsaturated carboxylic acid with styrene monomer or with a solution of styrene monomer and rubber.

In the production of rubber-modified styrene polymer in a continuous, plug-flow, multiple-stage system, a solution of styrene monomer, $\alpha,\beta$-unsaturated acid comonomer, and rubber are polymerized with agitation in multiple polymerization zones. After the polymerization begins, the system separates into two phases. Initially, the rubber in styrene is present in the larger amount and is the major of continuous phase. As the reaction proceeds and more polystyrene is formed, a phase inversion occurs whereupon the polystyrene in styrene becomes the continuous phase. At the phase inversion point the system must be agitated sufficiently to disperse the polystyrene-grafted rubber phase into roughly spherical particles which act to reinforce an otherwise brittle polystyrene matrix. Typically, polymerization is continued to a level in the last reactor stage such that up to about 95 percent of monomer has been converted to polymer, although about 80 to 90 percent conversion is preferred. Typically, polymeric material removed from the last reactor stage is devolatilized to remove residual monomer. Sufficient agitation is maintained in the first two reactor stages to disperse rubber particles adequately within the polymerizing mass. Typically, the last stage need not be agitated. The level of agitation required in a specific reactor system can be optimized readily be routine experimentation.

Rubbers which can be used in this invention include polybutadiene (PBD) and styrene-butadiene (SBR) rubbers. Typically, useful PBD rubbers are linear and branched polymers of butadiene containing from 25 to 99 percent cis content with less than 20 percent free vinyl unsaturation (i.e., 1,2-addition). A commonly used PBD would contain about 35 percent cis and about 14 percent free vinyl unsaturation. Solution viscosities for useful PBD's range from 25 to 220 centipoise and preferably range from 70 to 190 centipoise measured at a concentration of 5 percent by weight in styrene at 30° C. Useful SBR rubbers are random or block copolymers of butadiene and styrene, or combinations thereof, with 5 to 50 percent bound styrene. Typical solution viscosities are 20 to 190 centipoise and typical Mooney viscosities are 30 to 120. These rubbers can be present in styrene polymers at levels from about 2 to 20 percent and typically from about 3 to 10 percent.

In addition to styrene monomer, $\alpha,\beta$-unsaturated acid comonomer, and rubber, up to about 10 percent of other materials can be included in the polymerization feedstock, such as stabilizers, antioxidants, colorants, flame retardants, and lubricants.

The comonomers useful in forming the polymer suitable in this invention comprise styrene copolymerizable $\alpha,\beta$-unsaturated carboxylic acids. Examples of suitable comonomers include acrylic acid and methacrylic acid. Typically, the styrene polymers useful in this invention contain about 1 to about 40 weight percent and preferably, about 3 to about 30 weight percent comonomer and more preferably between about 3 to about 10 weight percent.

Acrylic films useful in this invention include sequentially emulsion polymerized cross-linked polymers of alkyl esters of acrylic and methacrylic acid. Such polymers can be produced by first reacting an alkyl ester of acrylic acid having an alkyl group containing 2 to 8 carbon atoms with 0.1 to 5 wt.%, preferably 0.5 to 1.5 wt.%, cross-linking monomer in an aqueous suspension medium. The cross-linking monomer is a bi- or polyfunctional compound with an ability to cross-link the alkyl acrylate. Suitable cross-linking monomers are alkylene glycol diacrylates such as ethylene glycol diacrylate and 1,3-butylene glycol diacrylate. In subsequent polymerization stages increasing proportions of 1 to 4 carbon alkyl methacrylate are used. Suitable emulsifying agents and free radical initiators are used. Suitable polymers can contain minor amounts of copolymerized acrylic and methacrylic acids. For example, a useful film can be formed from a rubbery, cross-linked poly(alkyl acrylate) dispersed in a continuous phase of a predominantly methacrylate polymer generally containing minor amounts of acrylates, acrylic acid, or methacrylic acid copolymerized therewith. Typically, useful films made from such polymers are nonblocking, i.e., do not stick together at storage temperature. Films useful in this invention are described further in U.S. Pat. Nos. 3,562,235, 3,812,205, 3,415,796, 3,654,069, 3,473,996 and Application Ser. No. 526,038, filed Feb. 9, 1966, all incorporated by reference herein.

The preferred film useful in this invention is an all-acrylic polymer film designated by the trademark KORAD and sold by Rohm and Haas Company.

Useful film thickness can range from less than one mil to above 10 mils, preferably between about two and about six mils and typically about three mils. Usually, film used in this invention contains pigment.

A styrene polymer-acrylic film laminate is prepared by application of heat and pressure. Typically, styrenic resin and acrylic film can be laminated at a suitable pressure, typically about 2,000 psi and a temperature above about 100° C., typically about 125° C., for a suitable time such as about five minutes. The pressure, temperature and time can be varied substantially from these values without altering the properties of the laminate produced.

The following Examples demonstrate but do not limit this invention.

EXAMPLE I-IV

A series of experiments were performed in which an acrylic film was bonded by heat and pressure to a styrene polymer substrate. In each experiment a sheet of pigmented acrylic film (KORAD, a trademark of Rohm and Haas Company) was placed on both sides of a ⅛ inch by 1¼ inch disc of styrene polymer substrate and bonded by applying pressure at 2,000 psi at 125° C. for about five minutes in a Buehler press. After application of heat and pressure the disc was removed from the press and inspected for film adhesion. Examples of this invention and comparative runs are listed in the Table.

TABLE

| Example (Run) | Styrene Polymer Composition | Film Adhesion Properties |
|---|---|---|
| (A) | Rubber-modified polystyrene | Film peeled off in a sheet |
| (B) | Crystal polystyrene | Film peeled off in a sheet |
| (C) | Styrene (90%)-maleic anhydride (10%) copolymer | Film came off in small pieces with little difficulty |
| (D) | Styrene (50%)-methyl methacrylate (50%) copolymer | Film came off in small pieces with little difficulty |
| I | Styrene (97%)-acrylic acid (3%) copolymer | Film came off in small pieces with some difficulty |
| II | Styrene (95%)-acrylic acid (5%) copolymer | Very difficult to scrape off film |
| III | Rubber-modified styrene (93%)-methacrylic acid (7%) copolymer | Some difficulty in removing film |
| IV | Rubber-modified styrene (95%)-acrylic acid (5%) copolymer | Very difficult to scrape off film |

As can be seen from the data presented in the Table, acrylic film does not adhere well to rubber-modified polystyrene, crystal polystyrene (styrene homopolymer) or copolymers of styrene and maleic anhydride or methyl methacrylate. However, acrylic film adheres to copolymers of styrene or rubber-modified copolymers of styrene where the comonomer is an $\alpha,\beta$-unsaturated carboxylic acid.

What is claimed is:

1. A method to form a two-layer laminate consisting essentially of bonding under heat and pressure (a) a substrate consisting essentially of a styrene polymer containing minor amounts of copolymerized $\alpha,\beta$-unsaturated carboxylic acid and (b) a polymeric acrylic film formed from a sequentially emulsion polymerized cross-linked polymer of alkyl esters of acrylic and methacrylic acids.

2. The method of claim 1 wherein the styrene polymer is a rubber-modified styrene polymer.

3. The method of claim 1 wherein between about 1 and 40 wt.% $\alpha,\beta$-unsaturated carboxylic acid is copolymerized with the styrene polymer.

4. The method of claim 1 wherein between about 3 and 30 wt.% $\alpha,\beta$-unsaturated carboxylic acid is copolymerized with the styrene polymer.

5. The method of claim 1 wherein the copolymerized $\alpha,\beta$-unsaturated carboxylic acid is acrylic acid or methacrylic acid.

6. The method of claim 1 wherein the copolymerized $\alpha,\beta$-unsaturated carboxylic acid is acrylic acid.

7. The method of claim 1 wherein the free polymeric acrylic film comprises a rubbery, cross-linked poly(alkyl acrylate) dispersed in a continuous phase of a predominantly methacrylate polymer containing minor amounts of acrylates, acrylic acid, or methacrylic acid copolymerized therewith.

8. The method of claim 2 wherein the copolymerized $\alpha,\beta$-unsaturated carboxylic acid is acrylic acid or methacrylic acid.

9. A laminate formed by the method of claim 1.

10. A laminate formed by the method of claim 7.

* * * * *